(12) United States Patent
Dojan et al.

(10) Patent No.: US 6,946,050 B2
(45) Date of Patent: Sep. 20, 2005

(54) METHOD FOR FLANGE BONDING

(75) Inventors: Fred Dojan, Vancouver, WA (US); K. Peter Hazenberg, Portland, OR (US)

(73) Assignee: Nike, LLC, Beaverton, OR (US)

( * ) Notice: Subject to any disclaimer, the term of this patent is extended or adjusted under 35 U.S.C. 154(b) by 205 days.

(21) Appl. No.: 10/351,876

(22) Filed: Jan. 27, 2003

(65) Prior Publication Data

US 2004/0144485 A1 Jul. 29, 2004

(51) Int. Cl.$^7$ .......................... B29C 65/00; A43B 13/00
(52) U.S. Cl. ............................... 156/304.1; 156/304.2; 36/25 R; 36/43; 12/142 R; 12/146 B
(58) Field of Search .......................... 156/304.1, 304.2, 156/304.3; 36/25 R, 43; 12/142 R

(56) References Cited

U.S. PATENT DOCUMENTS

| | | | |
|---|---|---|---|
| 1,970,802 A | | 8/1934 | Johnson |
| 2,977,633 A | | 4/1961 | Breitenstein |
| 3,117,903 A | | 1/1964 | Hix |
| 3,400,030 A | * | 9/1968 | Burger ........................ 156/153 |
| 3,552,265 A | * | 1/1971 | Lucas ......................... 409/145 |
| 3,959,058 A | * | 5/1976 | Rath et al. ................ 156/274.4 |
| 4,183,156 A | | 1/1980 | Rudy |
| 4,219,945 A | | 9/1980 | Rudy |
| 4,446,634 A | | 5/1984 | Johnson et al. |
| 4,547,641 A | * | 10/1985 | Nebergall et al. ............ 219/765 |
| 5,306,377 A | * | 4/1994 | Jensen et al. ............. 156/304.2 |
| 5,353,459 A | | 10/1994 | Potter et al. |
| 5,558,395 A | | 9/1996 | Huang |
| 5,794,361 A | | 8/1998 | Sadler |
| 5,937,462 A | | 8/1999 | Huang |
| 5,950,332 A | | 9/1999 | Lain |
| 5,976,451 A | | 11/1999 | Skaja et al. |
| 6,085,444 A | | 7/2000 | Cho |
| 2003/0075919 A1 | * | 4/2003 | Schulte-Ladbeck et al. ........................ 285/21.1 |

FOREIGN PATENT DOCUMENTS

| | | | |
|---|---|---|---|
| CH | 347051 | | 6/1960 |
| DE | 904 334 | | 2/1954 |
| EP | 0011558 | * | 5/1980 |
| JP | 52048534 | * | 4/1977 |
| JP | 58-28320 | * | 2/1983 |
| JP | 58187280 | | 11/1983 |
| JP | 09047887 | | 2/1997 |

OTHER PUBLICATIONS

Internet publication entitled "Fabrications In Fluoroplastics," from Adtech Polymer Engineering Ltd., which shows products that were on sale in this country at least one year prior to the filing date of the present application, 4 pages.

Internet publication entitled "Hot Die Equipment," from Beahm Designs, which shows products that were on sale in this country at least one year prior to the filing date of the present application, 3 pages.

International Search Report in corresponding PCT case, No. PCT/US2004/000007, mailed May 24, 2004.

* cited by examiner

Primary Examiner—Jeff H. Aftergut
Assistant Examiner—Justin Fischer
(74) Attorney, Agent, or Firm—Banner & Witcoff, Ltd.

(57) ABSTRACT

The invention is a method for joining two components of a fluid system. The method involves forming a first flange on a first fluid component and placing the first flange in an abutting relationship with a second flange that is formed on a second fluid component. The abutting relationship may be such that conduit portions of the fluid components are axially aligned. The flanges may then be bonded together such that the bond encircles the conduits and prevents fluid from entering or exiting the system from the bond. A bond of this type also places the first and second components in fluid communication. The fluid system may be incorporated into a sole structure of an article of footwear.

42 Claims, 7 Drawing Sheets

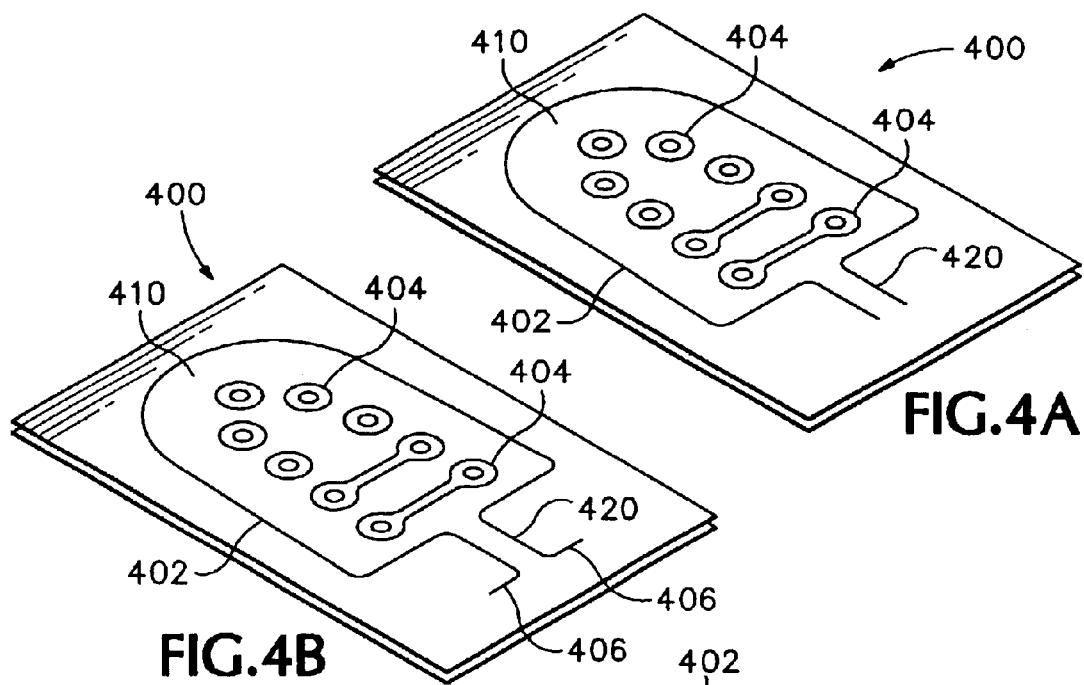
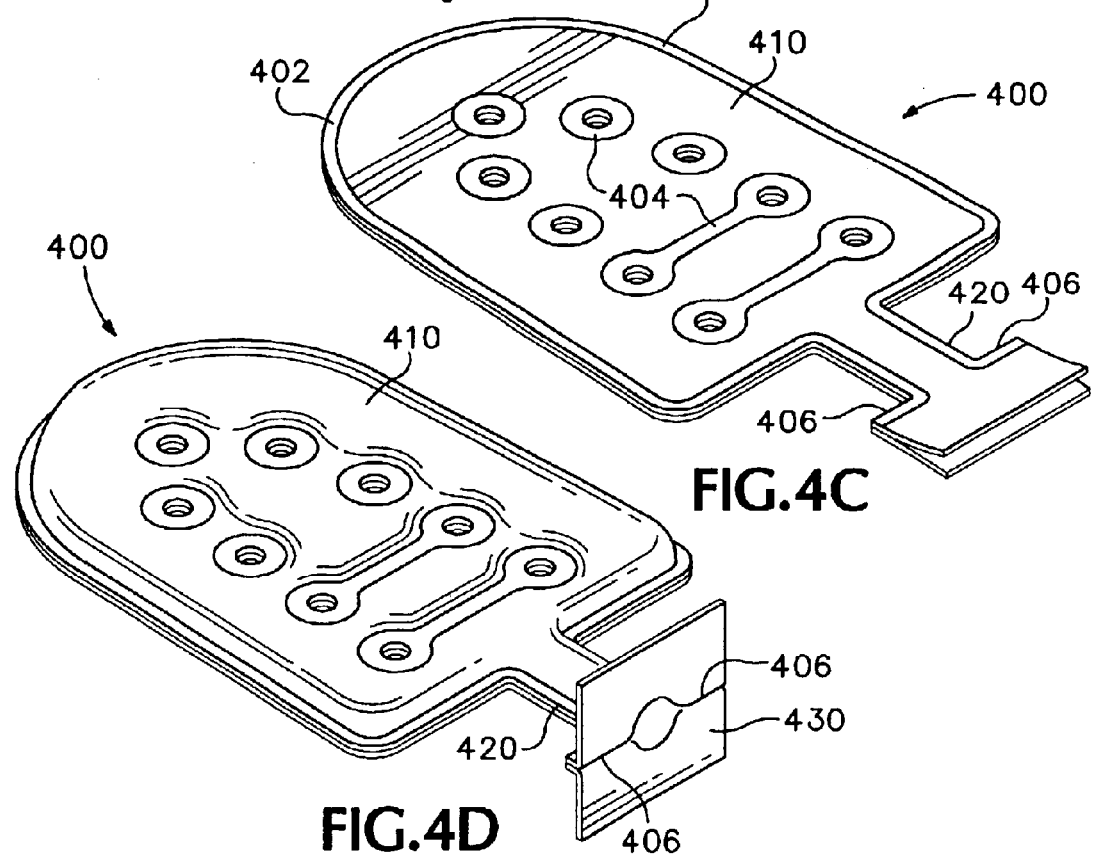

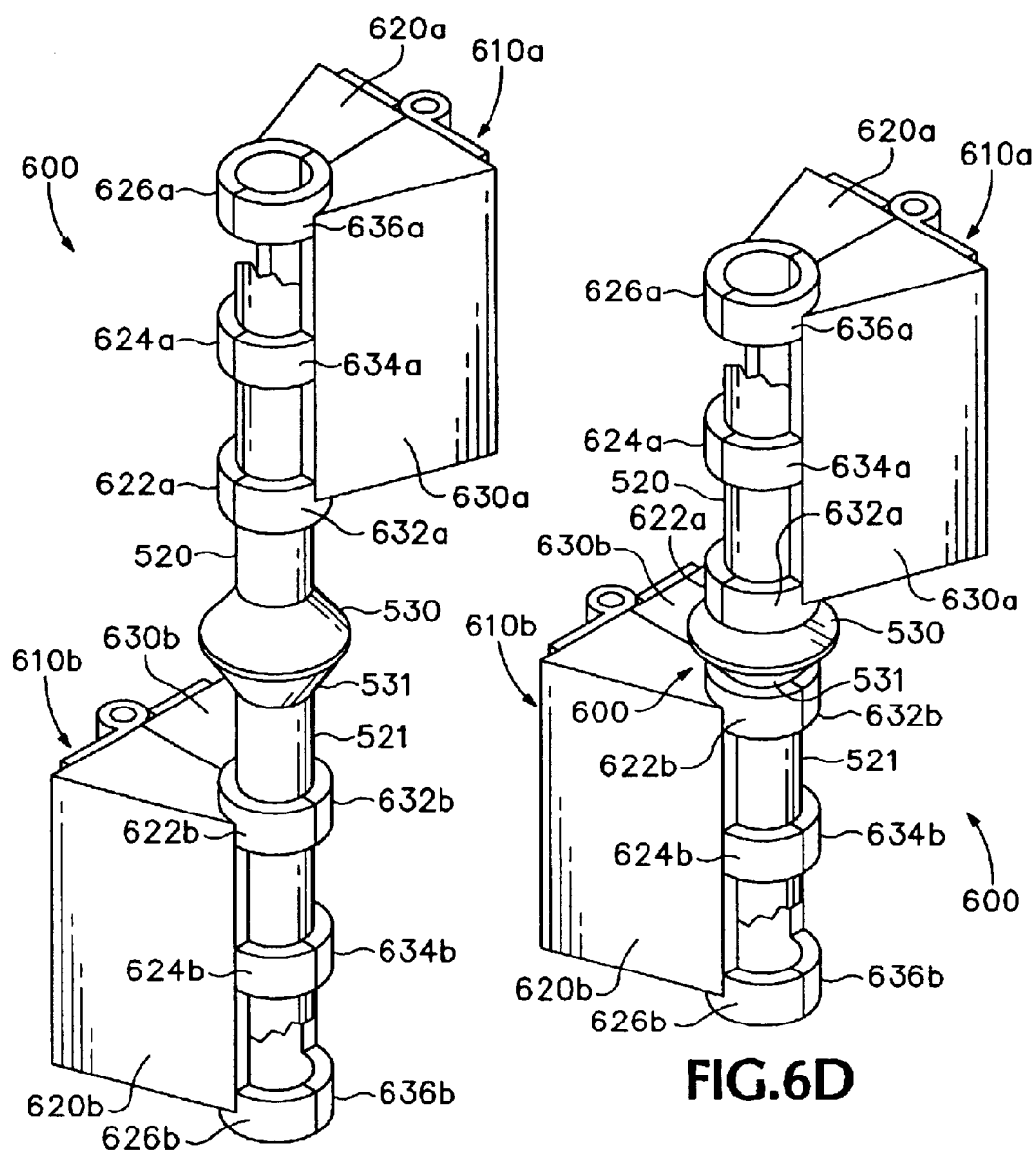

METHOD FOR FLANGE BONDING

BACKGROUND OF THE INVENTION

1. Field of the Invention

The present invention relates to fluid systems. The invention concerns, more particularly, a method for joining two components of a fluid system. The fluid system utilizes polymer components and finds particular use in footwear sole structures.

2. Description of Background Art

The primary elements of conventional footwear are an upper and a sole structure. Athletic footwear sole structures are generally formed of three layers, customarily referred to as an insole, a midsole, and an outsole. The insole is a thin, cushioning member located adjacent to the foot that improves footwear comfort. The midsole, typically formed of polyurethane or ethylvinylacetate foam, imparts both ground reaction force attenuation and energy absorption. The outsole provides a wear-resistant, ground-contacting surface.

Midsoles often incorporate fluid-filled bladders to enhance the ground reaction force attenuation and energy absorption characteristics of the sole structure. Fluid-filled bladders may be manufactured through a flat sheet bonding technique, as disclosed in U.S. Pat. Nos. 4,183,156 and 4,219,945, both to Rudy, in which two separate sheets of elastomeric film are formed having the overall peripheral shape of the bladder. The sheets are then bonded together along the periphery to form a bladder having upper, lower, and side surfaces, and at predetermined interior areas to give the bladder a desired configuration. Another method of manufacturing fluid-filled bladders is a blow-molding process, as generally disclosed in U.S. Pat. No. 5,353,459 to Potter et al., wherein a liquefied elastomeric material is placed in a mold having the desired overall shape and configuration of the bladder. The mold has an opening at one location through which pressurized air is provided. The pressurized air forces the liquefied elastomeric material against the inner surfaces of the mold and causes the material to harden in the mold, thereby forming a bladder with the desired shape and configuration. In addition, fluid-filled bladders may be manufactured through a vacuum-forming process, as disclosed in U.S. Pat. No. 5,976,451 to Skaja, et al., wherein a pair of sheets of flexible thermoplastic resin in which the sheets are placed against a pair of molds having a vacuum system for properly shaping the two sheets. The mold portions are then closed to seal the two sheets around their peripheries and form the bladder.

Sole structures may also incorporate fluid systems that include various components, including a pressure chamber, a pump chamber for increasing the pressure in the pressure chamber, one or more valves for regulating the direction and rate of fluid flow, and conduits that connect the various fluid system components. Fluid systems of this type, which are sealed to prevent the entry or exit of ambient air, are disclosed in U.S. Pat. No. 5,950,332 to Lain, U.S. Pat. No. 5,794,361 to Sadler, and U.S. Pat. No. 4,446,634 to Johnson et al., all hereby incorporated by reference. Similar systems, which utilize ambient air as the system fluid, are disclosed in U.S. Pat. No. 6,085,444 to Cho, U.S. Pat. No. 5,937,462 to Huang, and U.S. Pat. No. 5,558,395 to Huang, all hereby incorporated by reference.

Fluid systems may require multiple valves and chambers that are interconnected by various conduits. Simple fluid systems may be manufactured such that the various components are formed integral with each other. More complex fluid systems, however, require that the individual components be formed separately and subsequently incorporated into the fluid system. Accordingly, the components must be joined together in a manner that prevents the fluid contained by the system from escaping through the joint, but also places the joined components in fluid communication. In addition, the individual components may be formed from different materials; may be formed from flexible materials; and may be formed through different manufacturing processes, such as flat sheet bonding, vacuum forming, and blow molding. The present invention is a method for joining fluid system components of this type.

SUMMARY OF THE INVENTION

The present invention relates to a method of joining a first component with a second component, both components being formed of a polymer material, such that the first and second components are in fluid communication. The method includes the steps of constructing a first flange on the first component, constructing a second flange on the second component, positioning the first flange and the second flange in an abutting relation, and forming a bond between the first flange and the second flange.

A variety of techniques may be utilized to form flanges on the first and second components. The components may be formed without flanges and subsequently retrofitted to include flanges. Flanges may also be formed simultaneous with the formation of the component. The structure of the flange may also be dependent upon the manufacturing technique. Common manufacturing techniques for polymer components include flat sheet welding, vacuum forming, and blow molding, for example.

Once flanges are formed, the first and second components are positioned such that the flanges are in an abutting relationship. Generally, the components include a conduit portion and the flange is positioned on an end of the conduit portion. In the abutting relationship, the first flange is placed adjacent the second flange such that the conduit portions are axially aligned.

Following positioning of the first and second components in an abutting relationship, the flanges may be bonded together. The bond may encircle the axially aligned conduits and be spaced outward from the conduits. A bond of this type will prevent fluid from entering or exiting the system through the bond and will permit fluid transfer between the first and second components.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 4A is a perspective view of a flat sheet welded fluid system component in a first stage of manufacture.

FIG. 4B is a perspective view of the flat sheet welded fluid system component in a second stage of manufacture.

FIG. 4C is a perspective view of the flat sheet welded fluid system component in a third stage of manufacture.

FIG. 4D is a perspective view of the flat sheet welded fluid system component that includes a flange.

FIG. 6C is a first perspective view of the securing apparatus and two fluid system components secured by the securing apparatus.

FIG. 6D is a second perspective view of the securing apparatus and two fluid system components secured by the securing apparatus.

DETAILED DESCRIPTION OF THE INVENTION

Introduction

Referring to the figures and the following discussion, wherein like numerals indicate like elements, a method for flange bonding in accordance with the present invention is disclosed. The method for flange bonding is particularly suited for use with footwear fluid systems and other types of athletic equipment. The concepts presented in the following discussion and figures, however, may also have applications in the medical, automotive, and aerospace industries, for example. Accordingly, the present invention is intended to encompass flange bonding techniques that are suitable for a wide range of products in diverse areas of manufacture.

Figure 1A:
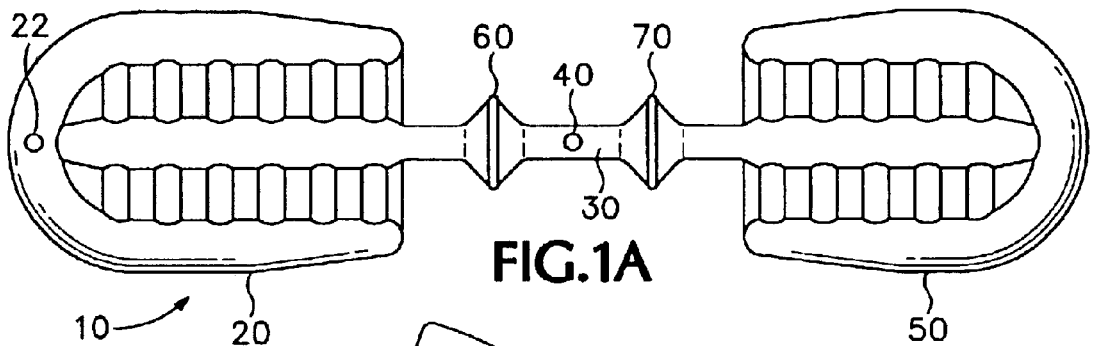
FIG. 1A is a top plan view of an exemplar fluid system having flange bonds constructed in accordance with an embodiment of the present invention.

An exemplar fluid system 10 is depicted in FIG. 1A and includes a pump chamber 20, a conduit 30, a valve 40, and a pressure chamber 50. Fluid system 10 also includes a first flange bond 60 that joins pump chamber 20 with conduit 30, and fluid system 10 includes a second flange bond 70 that joins an opposite end of conduit 30 with pressure chamber 50.

Conduit 30 is configured to place pump chamber 20 and pressure chamber 50 in fluid communication. Valve 40 is located within conduit 30 and is configured to regulate fluid flow through conduit 30, thereby regulating fluid transfer between pump chamber 20 and pressure chamber 50. In general, the pressure of a fluid contained within pump chamber 20 rises as pump chamber 20 is compressed. When the pressure of the fluid within pump chamber 20 exceeds the pressure of the fluid in pressure chamber 50 plus a differential pressure that represents an opening pressure of valve 40, a portion of the fluid within pump chamber 20 is transferred to pressure chamber 50 by passing through conduit 30 and valve 40. An inlet 22 provides pump chamber 20 with access to fluid located outside system 10, thereby permitting the fluid within pump chamber 20 to be replenished following a transfer of fluid to pressure chamber 50.

Figure 1B:
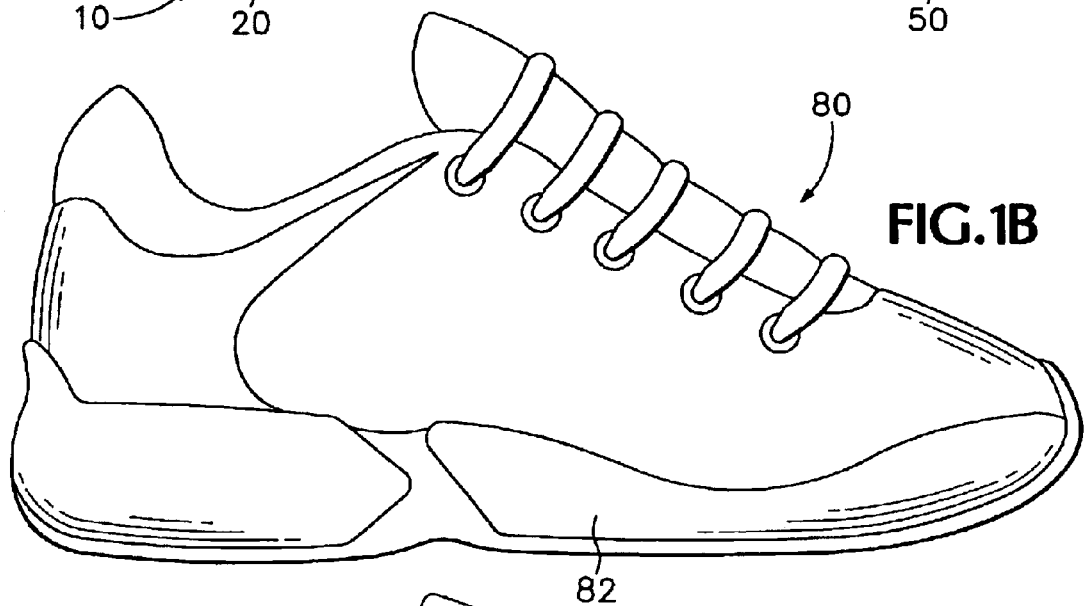
FIG. 1B is an elevation view of an article of footwear incorporating the fluid system.
Figure 1C:
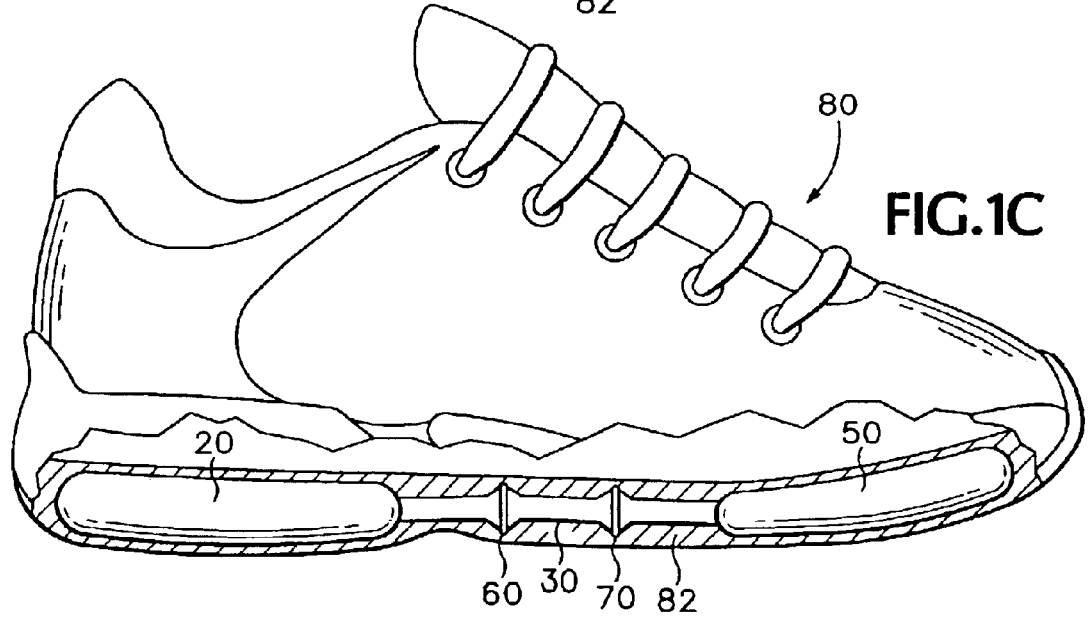
FIG. 1C is a partial cut-away view of the footwear depicting the fluid system.

Flange bonds 60 and 70 provide sealed joints between the various system components. Depending upon the manner in which system 10 is configured, the pressure of the fluid within pump chamber 20 and pressure chamber 50 may exceed 60 pounds per square inch. In addition, fluid system 10 may be incorporated into a sole structure 82 of an article of footwear 80, as depicted in FIGS. 1B and 1C, and repeatedly flexed as the wearer walks, runs, or otherwise utilizes footwear 80. Accordingly, flange bonds 60 and 70 have sufficient strength and durability to withstand high pressures and repetitive flexing. With regard to footwear 80, fluid system 10 is incorporated into a midsole 82. During the manufacturing process for midsole 82, fluid system 10 may be located within a mold and a resin material that forms ethylvinylacetate or polyurethane foam, for example, may be injected around fluid system 10 such that fluid system 10 is encapsulated within the resulting foam structure.

The various components of fluid system 10 may be formed through a variety of manufacturing techniques. For example, pump chamber 20 may be manufactured through a vacuum forming process wherein two layers of material are heated and a vacuum draws the two layers into a mold; conduit 30 may be formed through a flat sheet bonding process wherein valve 40 is located between two sheets of polymeric material and the two sheets are then joined along opposite sides with techniques that include an RF bonding, a laser bonding, or a vacuum forming process; and pressure chamber 50 may be formed with a blow molding process wherein molten polymer material is blown into a mold and subsequently cooled. Within the scope of the present invention, each component may also be formed from any manufacturing technique.

Fluid system 10 is intended to provide an example of a fluid system suitable for incorporating the flange bonding method of the present invention. A plurality of other fluid systems having varying degrees of complexity are also intended to fall within the scope of the present invention. The specific fluid system configuration may be selected by one skilled in the relevant art depending upon the particular requirements for which the fluid system is being utilized.

The method for flange bonding may generally be accomplished in three discrete steps: first, flanges are formed on the two components intended to be joined; second, the flange portions of the components are placed in an abutting relationship; and third, the flanges are bonded together. Each of these steps will be disclosed in detail in the following discussion.

First Step—Flange Formation

The specific manner in which a flange is formed on a fluid system component is primarily dependent upon whether the flange is formed at the time of manufacturing the component and the manufacturing technique utilized to form the component. Three exemplar scenarios will now be discussed.

One skilled in the relevant art will recognize that other scenarios may arise in practice. Generally, however, the concepts disclosed with regard to the three exemplar scenarios may be applied to a variety of other scenarios.

Figure 2A:
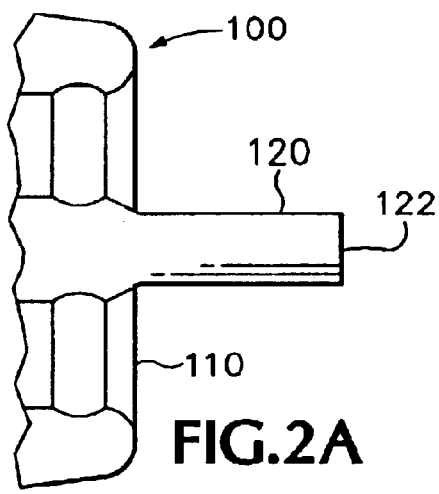
FIG. 2A is a plan view of a pre-manufactured fluid system component that is suitable for retrofitting.

In a first scenario, which is depicted in FIG. 2, a component 100 is premanufactured utilizing a vacuum forming or blow molding technique, but does not include a flange. In the blow-molding process, as generally disclosed in U.S. Pat. No. 5,353,459 to Potter et al. and hereby incorporated by reference, a liquefied elastomeric material is placed in a mold having the desired overall shape and configuration of the bladder. The mold has an opening at one location through which pressurized air is provided. The pressurized air forces the liquefied elastomeric material against the inner surfaces of the mold and causes the material to harden in the mold, thereby forming component 100 with the desired shape and configuration. In the vacuum-forming process, as disclosed in U.S. Pat. No. 5,976,451 to Skaja, et al. and hereby incorporated by reference, a pair of sheets of flexible thermoplastic resin in which the sheets are placed against a pair of molds having a vacuum system for properly shaping the two sheets. The mold portions are then closed to seal the two sheets around their peripheries and form component 100. In the past, components such as a pressure chamber generally included an integral conduit for purposes of inflation. Following proper inflation, the conduit was removed and the channel was heat sealed to prevent the inflation fluid from escaping. Component 100, depicted in FIG. 2A as a pressure chamber 110 that includes an integral conduit 120, was originally manufactured to be a sealed pressure chamber, but may be retrofitted in accordance with the present invention to include a flange on conduit 120. Note that component 100, as depicted, may be manufactured with a vacuum forming technique or a blow molding technique. The method of forming a flange on component 100 may also be utilized to form a flange on other types of components, even if formed from other techniques.

Figure 2B:
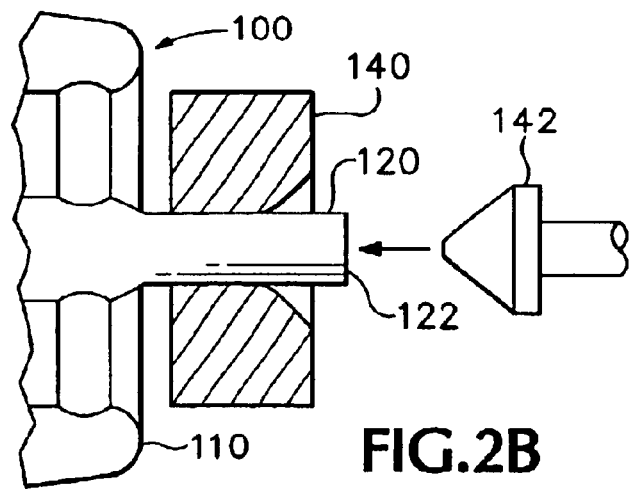
FIG. 2B is a plan view of the pre-manufactured fluid system component in combination with a flaring tool.
Figure 2C:
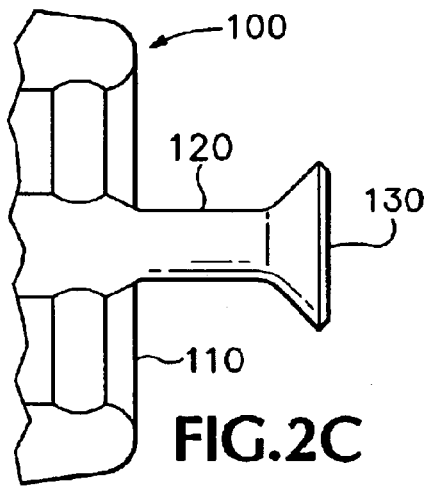
FIG. 2C is a plan view of the pre-manufactured fluid system component that includes a retrofitted flange.

Whether manufactured with a vacuum forming technique or a blow molding technique, pressure chambers, as with component 100, are typically formed from a thermoplastic material. Advantageously, the material becomes more pliable or molten when heated. Accordingly, a flange may be formed on an end 122 of conduit 120 by generally heating end 122 and stretching the material into a flange shape. Conventional techniques may be utilized to heat and stretch end 122. One such technique involves heating with radiant heat, from a heat gun, for example. Once end 122 is heated to a temperature at which thermoforming may occur, a flaring tool is utilized to form a flange 130. Accordingly, conduit 120 may be inserted through an aperture in a block portion 140 of the flaring tool such that end 122 protrudes through the opposite side of block portion 140, as depicted in FIG. 2B. An end of a bit 142 having a conic shape, for example, is then inserted into end 122 such that end 122 flares outward and is converted into flange 130, as depicted in FIG. 2C. Accordingly, premanufactured components that do not include a flange may be readily retrofitted to include a flange.

Figure 3A:
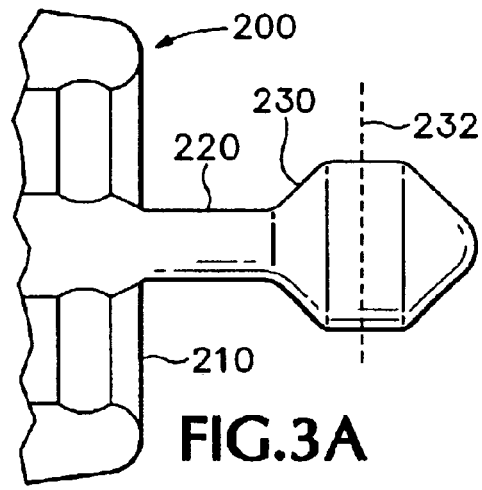
FIG. 3A is a plan view of a vacuum formed fluid system component.
Figure 3B:
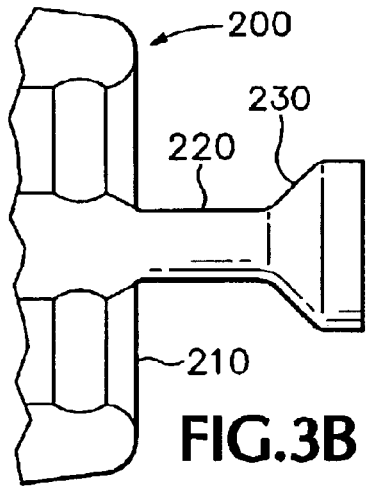
FIG. 3B is a plan view of the vacuum formed fluid system component in FIG. 3A including a flange.
Figure 3C:
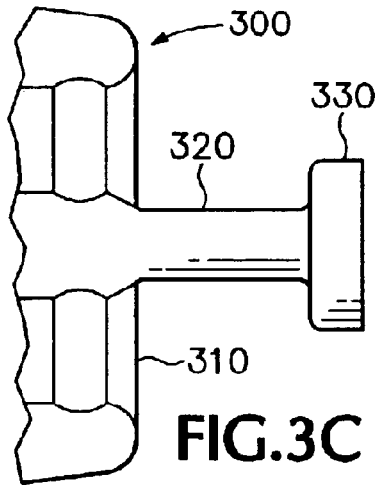
FIG. 3C is a plan view of a blow molded fluid system component that includes a flange.

In a second scenario, which is depicted in FIGS. 3A–3C, a component 200 is manufactured utilizing a vacuum forming technique and a component 300 is manufactured utilizing a blow molding technique, and both component 200 and component 300 include a flange. Whereas component 100 may not have been manufactured specifically for the flange bonding technique of the present invention and component 100 is retrofitted to include such a flange, components 200 and 300 are specifically manufactured to accommodate the flange bonding technique and, therefore, include integral flanges 230 and 330, respectively.

Component 200, which is vacuum formed, includes a pressure chamber 210, a conduit 220, and flange 230. In order to form component 200, two sheets of thermoplastic material are heated and placed between opposing portions of a mold. As the mold compresses the two sheets together, a vacuum is formed in the opposing portions of the mold, thereby drawing the sheets into the various portions of the mold and forming conduit 220, flange 230, and the contoured exterior surface of pressure chamber 210. Perimeter portions of the sheets are simultaneously bonded together, thereby forming a sealed chamber, as depicted in FIG. 3A. Accordingly, an excess portion of flange 230 is formed during the vacuum forming process and the excess portion is trimmed generally along line 232 to form a flange 230 that is suitable for subsequent steps of the method being discussed. FIG. 3B depicts component 200 with the excess portion of flange 230 removed.

Component 300, which is formed through a blow molding process, includes a pressure chamber 310, a conduit 320, and flange 330, as depicted in FIG. 3C. In order to form component 300, a conduit of molten thermoplastic polymer material is blown into a mold and subsequently cooled. The fluid utilized to blow the polymer material against surfaces of the mold and form pressure chamber 310 enters the mold through an opening in the mold. The opening serves to form conduit 320 and the opening may be modified to include a flared portion that forms flange 330.

In a third scenario, which is depicted in FIGS. 4A–4D, a component 400 is manufactured utilizing a flat sheet bonding process. In general, flat sheet bonding involves two sheets of thermoplastic material that are bonded together at specified locations, as depicted in FIG. 4A. The bonding locations may include a perimeter bond 402 that forms a pressure chamber 410 and a conduit 420. In addition, the bonding locations may include a series of interior bonds 404 that prevent the sheets from excessively separating following inflation of pressure chamber 410. In the past, a fluid was inserted into pressure chamber 410 through conduit 420 and conduit 420 was subsequently sealed to prevent the fluid from escaping. In accordance with the present invention, however, two curved extensions 406 may be added to the ends of perimeter bond 402, as depicted in FIG. 4B. Extensions 406 may be formed simultaneously and integral with perimeter bond 402, or extensions 406 may be formed separately and subsequently to perimeter bond 406. Accordingly, extensions 406 may be an integral portion of the bonding steps that forms component 400, or may be utilized to retrofit an existing component 400.

Following the formation of perimeter bond 402, interior bonds 404, and extensions 406, excess portions the polymer layers may be trimmed from pressure chamber 410 and conduit 420, but a portion of the excess material adjacent to extensions 406 is preserved, as depicted in FIG. 4C. The excess material may then be separated and bent perpendicular to the plane of pressure chamber 410, as depicted in FIG. 4D, thereby forming a flange 430. Without the formation of extensions 406, flange 430 would have two slits in the preserved portion of the excess material. Extensions 406, therefore, bond the slits together and provide a continuous flange. As an alternative, however, a flaring tool may also be utilized to form flange 430. If the flaring tool is utilized, however, a flange may be formed without the necessity of utilizing extensions 406.

The techniques for forming flanges discussed in relation to the three scenarios may be applied to a variety of other fluid system components, including conduits and pump chambers. In addition, the techniques may be applied to components formed through a variety of manufacturing techniques, in addition to vacuum forming, blow molding, and flat sheet bonding. Polymer components formed through injection molding processes may also be utilized within the scope of the present invention. Accordingly, the flange bonding process of the present invention may be applied to a variety of fluid system components, in addition to the bladders discussed above.

Second Step—Abutting Flanges

The second step of the method for flange bonding involves placing the flanges of two components in an abutting relationship. In a proper abutting relationship, edge portions of the flanges make contact such that the conduits that extend away from the flanges are axially aligned. In this relationship, bonding of the flange portions together, as discussed in the third step, yields a configuration wherein the conduits are in fluid communication and the flange bond prevents the fluid from exiting the system.

FIG. 5 depict pairs of flanges that are in a proper abutting relationship. For clarity, the remainder of the components associated with the flanges are omitted. FIG. 5A depicts a pair of flanges 530 and 531 that were formed as a retrofit, in accordance with in the first scenario discussed above. FIG. 5B depicts a pair of flanges 532 and 533. Flange 532 was formed as a retrofit, in accordance with in the first scenario discussed above. Flange 533, however, was formed simultaneously with a vacuum formed component, as discussed in the second scenario above. FIG. 5C depicts a pair of flanges 534 and 535. Flange 534 was formed simultaneously with a blow molded component, as discussed in the second scenario above, and flange 535 was formed through a flat sheet bonding process, as discussed in the third scenario above. FIG. 5D depicts a pair of flanges 536 and 537 that were both formed simultaneously with a blow molded component. FIG. 5E depicts a pair of flanges 538 and 539 that were both formed simultaneously with a flat sheet bonded component. The combinations of flanges depicted in FIGS. 5A to 5E are for example only. A variety of other combinations may also be made within the scope of the present invention.

Figure 6A:
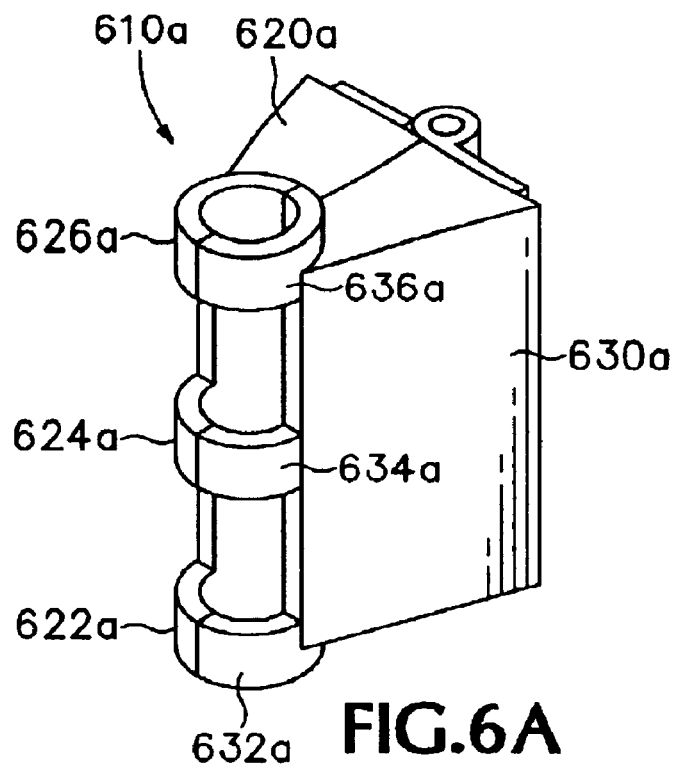
FIG. 6A is a perspective view of a portion of a securing apparatus in a closed position.
Figure 6B:
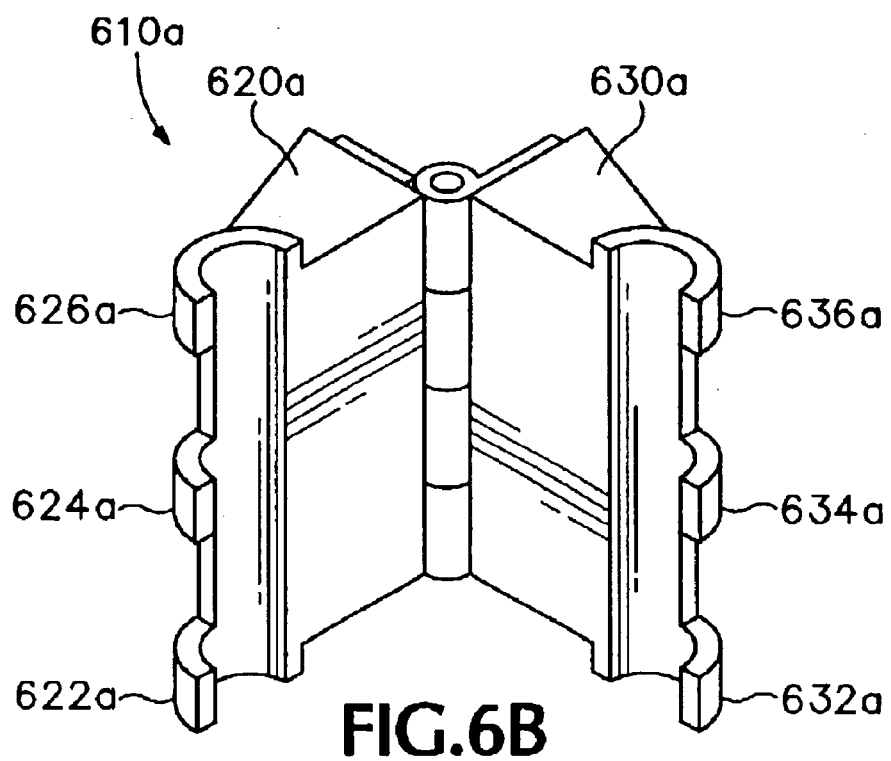
FIG. 6B is a perspective view of the portion of the securing apparatus in an open position.

A securing apparatus 600, depicted in FIG. 6, is designed to secure two flanges in an abutting position. Securing apparatus 600 may also be utilized to compress the flanges together and form a bond between the flanges, as discussed in relation to the third step of the method. Securing apparatus 600 includes two substantially identical portions 610a and 610b. Portion 610a includes two elements 620a and 630a that are hinged, thereby permitting elements 620a and 630a to move relative to each other. Element 620a has three semi-circular arms 622a, 624a, and 626a that mate with three semicircular arms 632a, 634a, and 636a formed in element 630a. When elements 620a and 630a are in a closed position, as depicted in FIG. 6A, arms 622a–626a contact arms 632a–636a, respectively, thereby forming a series of closed circles. When elements 620 and 630 are in an open position, as depicted in FIG. 6B, arms 622a–626a and arms 632a–636a are spaced apart. Portion 610b has corresponding components, including an element 620b, which includes arms 622b, 624b, and 626b, and an element 630b, which includes arms 632b, 634b, and 636b. As an alternative, arms 622a–626a, 622b–626b, 632a–636a, and 632b–636b may have a shape other than semicircular.

Figure 5A:
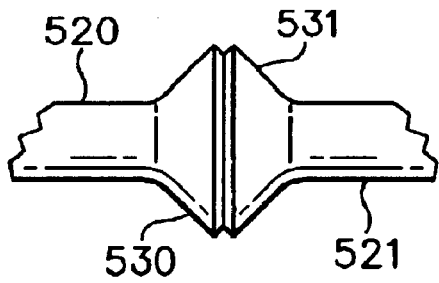
FIGS. 5A to 5E are elevational views of various flange configurations in an abutting relationship.
Figure 5B:
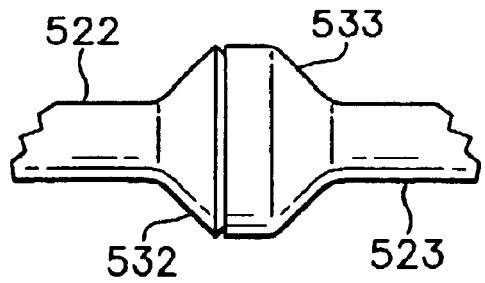
Figure 5C:
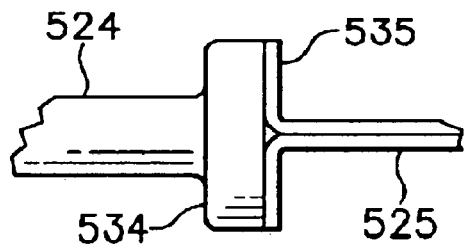
Figure 5D:
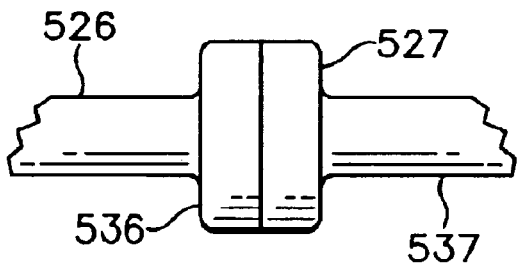
Figure 5E:
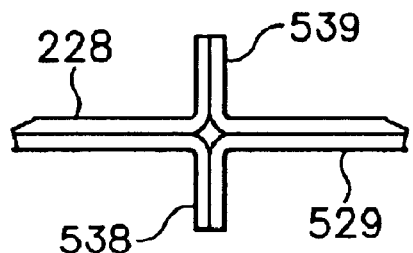

FIG. 5A depicts two components that will be referenced for purposes of the following discussion. With elements 620a and 630a in the open position, conduit 520 may be located on arms 622a–626a such that flange 530 is adjacent to arm 626a. Elements 620a and 630a may then be closed, as depicted in FIG. 6C, such that conduit 520 is encircled by arms 622a–626a and 632a–636a, and flange 530 is located adjacent to arms 626a and 636a. Conduit 521 and flange 531 may also be positioned in portion 610b such that conduit 521 is encircled by arms 622b–626b and 632b–636b, and flange 531 is located adjacent to arms 622b and 632b. In this position, flanges 530 and 531 are secured in an abutting relationship. One skilled in the relevant art will recognize that a plurality of other apparatuses may be utilized to secure two flanges in an abutting relationship and the present invention is not intended to the limited to a configuration similar to securing apparatus 600.

Third Step—Joining Flanges

Following abutment of the flanges, a bond is formed between the flanges to permanently join the two components. With reference to FIG. 5 and FIG. 6C, the conduit portions of the components are axially aligned. A bond formed between the flanges, particularly the portions of the flanges that are spaced outward from the entrance to the conduit, will not hinder fluid flow between the conduits, thereby placing the components in fluid communication. Also, a bond that encircles the conduits will provide a seal that prevents fluid from entering the fluid system or escaping from the fluid system.

A variety of techniques may be utilized to form the bond between the flanges, including radio frequency (RF) bonding, thermal contact bonding, laser bonding, chemical bonding, ultrasonic bonding, infrared bonding, and adhesive bonding, for example. In RF bonding, one or more RF electrodes contact and compress the desired bonding areas. The RF electrodes are then activated such that the area of contact is exposed to a specific level of RF energy for a predetermined period of time. The RF energy is absorbed by the polymer layers and the temperature of the polymer layers rise until portions of the polymer layers melt. Intermingling of the molten polymer layers coupled with subsequent cooling forms a bond at the interface between the polymer layers.

Securing apparatus 600 may also be utilized to form the bond between the flanges. With reference to FIG. 6D, portions 610a and 610b are moved together such that flanges 530 and 531 are not only in an abutting relationship, but are also compressed between arms 622a, 632a, 622b, and 632b. To facilitate bonding, arms 622a, 632a, 622b, and 632b may be configured to emit RF energy, thereby exposing the portions of flanges 530 and 531 located adjacent to arms 622a, 632a, 622b, and 632b with the RF energy.

Figure 7A:
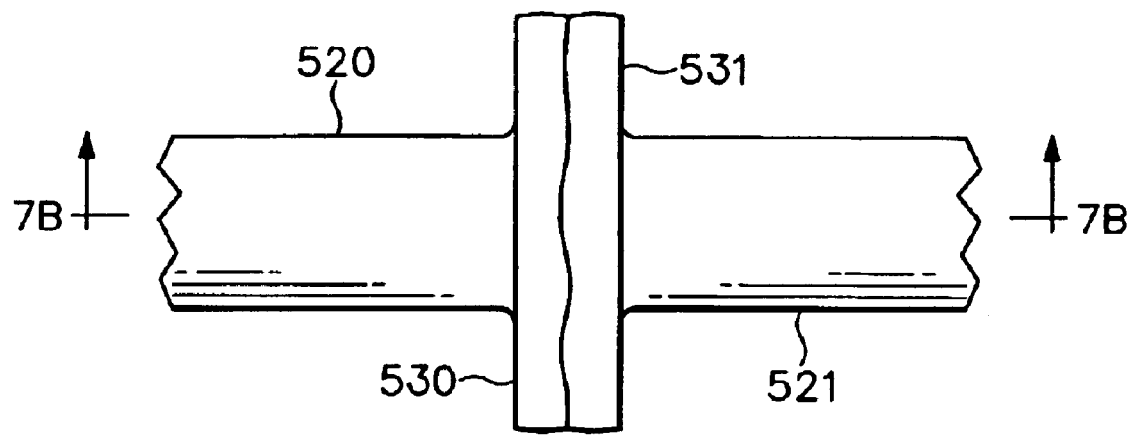
FIG. 7A is an elevational view of the fluid system components from FIGS. 6C and 6D in a bonded configuration.
Figure 7B:
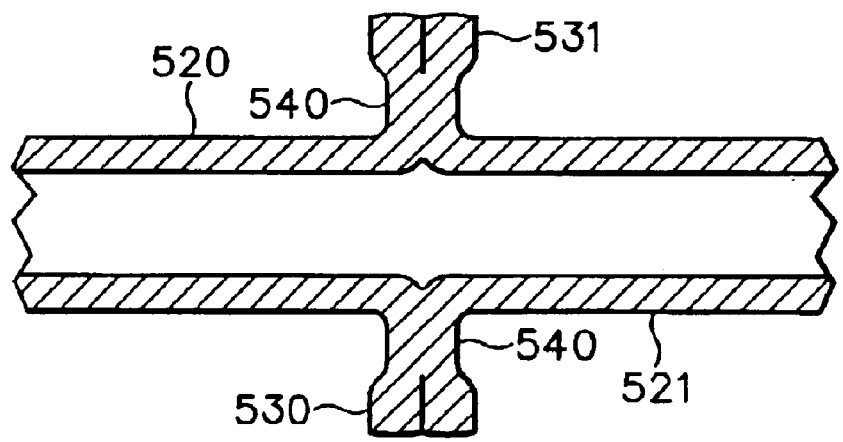
FIG. 7B is a cross-sectional view of the fluid system components depicted in FIG. 7A, as defined by line 7B—7B.

The RF energy, coupled with subsequent cooling, forms a bond 540 between flanges 530 and 531. Portions 610a and 610b may then be opened such that the components may be removed. Bond 540, depicted in FIGS. 7A and 7B, will be sealed such that fluid may not enter or exit the fluid system through bond 540. Furthermore, bond 540 will have sufficient strength and durability to withstand high pressures and repetitive flexing. Bonds formed between the other types of components depicted in FIG. 5 will have an appearance that is substantially similar to FIGS. 7A and 7B.

CONCLUSION

The flange bonding method disclosed above provides a technique for joining two components of a fluid system such that the two components are in fluid communication. The method is capable of being used for components formed through processes that include flat sheet bonding, vacuum forming, and blow molding, even if the components are not formed through the same process. Furthermore, the method forms a sealed bond that is sufficiently flexible and durable to withstand repetitive bending and high fluid pressures. Although the flange bonding method is disclosed in relation to footwear applications, the present invention is intended to encompass applications unrelated to footwear that utilize the flange bonding method.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A method of joining a first conduit with a second conduit such that said first conduit and said second conduit are in fluid communication, said first conduit and said second conduit being formed from a polymer material, the method comprising steps of:

constructing a first flange on said first conduit;

constructing a second flange on said second conduit;

positioning said first flange and said second flange in an abutting relationship;

forming a bond between said first flange and said second flange; and incorporating said first conduit and said second conduit into a fluid system and at least partially locating said fluid system within an article of footwear.

2. The method of claim 1, further including a step of manufacturing said first conduit with a vacuum forming process.

3. The method of claim 2, wherein the step of constructing said first flange includes heating and stretching said first conduit portion.

4. The method of claim 2, wherein the step of manufacturing said first conduit and the step of constructing said first flange are performed simultaneously such said first flange is formed as a part of the vacuum forming process.

5. The method of claim 1, further including a step of manufacturing said first conduit with a blow molding process.

6. The method of claim 5, wherein the step of constructing said first flange includes heating and stretching said first conduit portion.

7. The method of claim 5, wherein the step of manufacturing said first conduit and constructing said first flange are performed simultaneously such that said first flange is formed as apart of the blow molding process.

8. The method of claim 1, further including a step of manufacturing said first conduit with a flat sheet bonding process that includes placing one sheet of polymer material on top of a second sheer of polymer material and constructing a perimeter bond between the first and second sheets of polymer material, said perimeter bond extending along edge portions of said first and second sheets of polymer material.

9. The method of claim 8, wherein the step of constructing maid first flange includes:

placing extensions on end portions of said perimeter bond;

removing a first excess portion of said two sheets, said first excess portion being located adjacent said perimeter bond;

retaining a second excess portion of said two sheets, said second excess portion being located adjacent to said extensions, said second excess portions forming said first flange.

10. The method of claim 1, wherein the step of constructing said first flange includes retrofitting said first conduit to include said first flange.

11. The method of claim 1, wherein the step of constructing said first flange includes forming said first flange simultaneous with a manufacture of said first conduit.

12. The method of claim 1, wherein the step of positioning said first flange and said second flange includes axially aligning said first conduit and said second conduit.

13. The method of claim 12, wherein the step of positioning said first flange and said second flange includes utilizing a securing apparatus to secure a relative position of said first flange and said second flange.

14. The method of claim 13, wherein the step of forming said bond includes utilizing radio frequency electrodes on said securing apparatus to form said bond.

15. The method of claim 1, wherein the step of forming said bond includes locating said bond around said first flange and said second flange.

16. The method of claim 1, wherein the step of forming said bond includes utilizing one of a group selected from a radio frequency bonding process, a laser bonding process, a thermal bonding process, and an adhesive.

17. A method of joining a first component with second component such that said first component and said second component are in fluid communication, said first component and said second component being formed from a polymer material, the method comprising steps of:

constructing a first flange on a first conduit portion of said first component;

constructing a second flange on a second conduit portion of said second component;

positioning said first flange and said second flange in an abutting relationship such that said conduit portions are axially aligned;

forming a bond between said first flange and said second flange, said bond circumscribing said conduit portions; and incorporating said first component and said second component into a fluid system and locating said fluid system within a sole structure of an article of footwear.

18. The method of claim 17, further including a stop of manufacturing said first component with a vacuum forming process.

19. The method of claim 18, wherein the step of manufacturing said first component includes constructing a first conduit portion integral with said first component.

20. The method of claim 19, wherein the step of constructing said first flange includes forming said first flange on an end of said first conduit portion.

21. The method of claim 19, wherein the step of constructing said first flange includes heating and stretching said first conduit portion.

22. The method of claim 19, wherein the step of manufacturing said first component and the step of constructing said first flange are performed simultaneously such that said first flange is formed as a part of the vacuum forming process.

23. The method of claim 17, further including a step of manufacturing said first component with a blow molding process.

24. The method of claim 23, wherein the step of manufacturing said first component includes constructing said first conduit portion integral with said first component.

25. The method of claim 24, wherein the step of constructing said first flange includes forming said first flange on an end of said first conduit portion.

26. The method of claim 24, wherein the step of constructing said first flange includes heating and stretching said first conduit portion.

27. The method of claim 24, wherein the step of manufacturing said first component and constructing said first flange are performed simultaneously such that said first flange is formed as a part of the blow molding process.

28. The method of claim 17, further including a step of manufacturing said first component with a flat sheet bonding process that includes placing one sheet of polymer material on top of a second sheet of polymer material and constructing a perimeter bond between the first and second sheets of polymer material, said perimeter bond defining said conduit portion of said first component.

29. The method of claim 28, wherein the step of constructing said first flange includes:

placing extensions on end portions of said perimeter bond;

removing a first excess portion of said two sheets, said first excess portion being located adjacent said perimeter bond;

retaining a second excess portion of said two sheets, said second excess portion being located adjacent to said extensions, said second excess portions forming said first flange.

30. The method of claim 17, wherein the step of constructing said first flange includes retrofitting said first component to include said first flange.

31. The method of claim 17, wherein the step of constructing said first flange includes heating and stretching said first conduit portion of said first component.

32. The method of claim 17, wherein the step of constructing said first flange includes forming said first flange simultaneous with a manufacture of said first component.

33. The method of claim 17, wherein the step of positioning said first flange and said second flange includes utilizing a securing apparatus to secure a relative position of said first flange and said second flange.

34. The method of claim 33, wherein the step of forming said bond includes utilizing radio frequency electrodes on said securing apparatus to form said bond.

35. The method of claim 17, wherein the step of forming said bond includes locating said bond around conduit portions of said first component and said second component.

36. The method of claim 17, wherein the step of forming said bond includes utilizing one of the group selected from a radio frequency bonding process, a laser bonding process, a thermal bonding process, and an adhesive.

37. A method of joining a first component with a second component such that said first component and said second component are in fluid communication, said first component and said second component being formed from a polymer material, the method comprising steps of:

constructing a first flange on a first conduit portion of said first component;

constructing a second flange on a second conduit portion of said second component;

locating said first conduit portion and said second conduit portion in a securing apparatus following construction of said first flange and said second flange;

positioning said first flange and said second flange in an abutting relationship such that said conduit portions are axially aligned;

forming a bond between said first flange and said second flange, said bond circumscribing said conduit portions; and incorporating said first component and said component into fluid system and locating said fluid system within a sole structure of an article of footwear.

38. The method of claim 37, wherein the step of constructing said first component and said first flange includes forming said first flange simultaneously with a manufacture of said first component.

39. The method of claim 37, wherein the step of constructing said first flange includes retrofitting said first component to include said first flange.

40. The method of claim 37, wherein the step of constructing said first flange includes heating and stretching a conduit of said first component.

41. The method of claim 37, wherein the step of positioning said first flange and said second flange includes utilizing said securing apparatus to secure a relative position of said first flange and said second flange.

42. The method of claim 37, wherein the step of forming said bond includes utilizing radio frequency electrodes on said securing apparatus to form said bond.

* * * * *

UNITED STATES PATENT AND TRADEMARK OFFICE
CERTIFICATE OF CORRECTION

PATENT NO. : 6,946,050 B2
DATED : September 20, 2005
INVENTOR(S) : Dojan et al.

It is certified that error appears in the above-identified patent and that said Letters Patent is hereby corrected as shown below:

<u>Title page,</u>
Item [73], Assignee, change "Nike, LLC" to -- NIKE, Inc. --.

Signed and Sealed this

First Day of November, 2005

JON W. DUDAS
*Director of the United States Patent and Trademark Office*